United States Patent
Kreikemeier

(10) Patent No.: US 9,832,940 B2
(45) Date of Patent: Dec. 5, 2017

(54) IRRIGATION SYSTEM HAVING TERRAIN COMPENSATION

(71) Applicant: Valmont Industries, Inc., Omaha, NE (US)

(72) Inventor: Bruce Kreikemeier, West Point, NE (US)

(73) Assignee: Valmont Industries, Inc., Omaha, NE (US)

( * ) Notice: Subject to any disclaimer, the term of this patent is extended or adjusted under 35 U.S.C. 154(b) by 0 days.

(21) Appl. No.: 15/135,208

(22) Filed: Apr. 21, 2016

(65) Prior Publication Data

US 2016/0309667 A1 Oct. 27, 2016

Related U.S. Application Data

(60) Provisional application No. 62/150,927, filed on Apr. 22, 2015.

(51) Int. Cl.
*A01B 69/00* (2006.01)
*A01G 25/09* (2006.01)

(52) U.S. Cl.
CPC .................. *A01G 25/09* (2013.01)

(58) Field of Classification Search
USPC .......................................................... 701/41
See application file for complete search history.

(56) References Cited

U.S. PATENT DOCUMENTS

| 2,893,643 | A | * | 7/1959 | Gordon | A01G 25/092 180/21 |
|---|---|---|---|---|---|
| 4,172,556 | A | * | 10/1979 | Standal | A01G 25/097 239/1 |
| 4,609,147 | A | * | 9/1986 | Chapman | A01G 25/09 239/735 |
| 4,858,329 | A | * | 8/1989 | Manor | G01B 7/28 33/1 H |
| 2002/0008167 | A1 | * | 1/2002 | Haberland | A01G 25/167 239/722 |
| 2015/0129680 | A1 | * | 5/2015 | Abts | A01G 25/092 239/73 |
| 2015/0150200 | A1 | * | 6/2015 | Abts | A01G 25/092 239/71 |

\* cited by examiner

*Primary Examiner* — Tyler Paige
(74) *Attorney, Agent, or Firm* — Milligan PC LLO

(57) ABSTRACT

A control system for an irrigation system is disclosed that is configured to prevent a substantial positional change of the irrigation system while the system is traversing a substantially non-flat terrain, or surface. In an implementation, an irrigation system includes multiple interconnected spans that are supported by multiple tower structures. Each tower structure includes a drive unit for driving a tower structure at a selected speed. The irrigation system also includes a position-determining module configured to determine an actual position of the main section assembly. The irrigation system also includes a control device configured to determine an actual position of the main section assembly, compare the actual position with a desired position of the main section assembly, and to determine that the main section assembly is traversing a substantially non-flat surface.

7 Claims, 5 Drawing Sheets

IRRIGATION SYSTEM HAVING TERRAIN COMPENSATION

RELATED APPLICATIONS

The present application claims priority to U.S. Provisional Application No. 62/150,927 filed Apr. 22, 2015.

FIELD OF INVENTION

The present invention is related in general to irrigation systems, in particular, to a method for controlling the position of a movable irrigation system.

BACKGROUND OF THE INVENTION

Modern day agriculture has become increasingly efficient in the past century and this trend must continue in order to produce a sufficient food supply for the increasing world population. A notable advancement in agricultural production was the introduction of mechanized irrigation systems, such as linear move irrigation systems. These irrigation systems make it possible to irrigate entire fields, and reduce a crop yield's vulnerability to extreme weather conditions. The ability to monitor and to control the amount of water and/or nutrients (applicants) applied to an agricultural field has increased the amount of farmable acres in the world and increases the likelihood of a profitable crop yield. These irrigation systems typically include a control device configured to furnish a user interface allowing the operator to monitor and control one or more functions or operations of the irrigation system.

In the current state of the art, when an irrigation system traverses rough or hilly terrain, a position reporting device may be shifted off the desired path as the machine tips, inducing an error that falsely shows that the irrigation system has moved off the desired path. In response, a guidance system of the irrigation system may cause the irrigation system to steer in response to a detected positional change. In doing so, the irrigation system may actually be off the desired path when the terrain is no longer rough or hilly, which causes the guidance system to steer again to compensate for the previous steering action. This unrequired steering may cause the irrigation system to have wider wheel tracks and to steer more than required. As disclosed below, the present invention overcomes these important limitations.

SUMMARY OF THE INVENTION

A control system for an irrigation system is disclosed that is configured to prevent a substantial positional change of the irrigation system while the system is traversing a substantially non-flat terrain, or surface. In an implementation, an irrigation system includes multiple interconnected spans that are supported by multiple tower structures. Each tower structure includes a drive unit for driving a tower structure at a selected speed. The irrigation system also includes a position-determining module configured to determine an actual position of the main section assembly. The irrigation system also includes a control device configured to determine an actual position of the main section assembly, compare the actual position with a desired position of the main section assembly, and to determine that the main section assembly is traversing a substantially non-flat surface. The control device is also configured to adjust a position value in response to determining that the main section assembly is traversing a substantially non-flat surface. Preferably, the positional value represents an actual position of the irrigation main section assembly. This summary is provided solely to introduce subject matter that is fully described in the Detailed Description and Drawings. Accordingly, this summary should not be considered to describe essential features nor be used to determine scope of the claims.

Other goals and advantages of the invention will be further appreciated and understood when considered in conjunction with the following description and accompanying drawings. While the following description may contain specific details describing particular embodiments of the invention, this should not be construed as limitations to the scope of the invention but rather as an exemplification of preferable embodiments. For each aspect of the invention, many variations are possible as suggested herein that are known to those of ordinary skill in the art. A variety of changes and modifications can be made within the scope of the invention without departing from the spirit thereof.

BRIEF DESCRIPTION OF THE DRAWINGS

Elements in the figures have not necessarily been drawn to scale in order to enhance their clarity and to improve the understanding of the various elements and embodiments of the invention. Furthermore, elements that are known to be common and well understood to those in the industry are not depicted in order to provide a clear view of the various embodiments of the invention. Thus, it should be understood that the drawings are generalized in form in the interest of clarity and conciseness.

DETAILED DESCRIPTION

Various inventive features are described below that can each be used independently of one another or in combination with other features. However, any single inventive feature may not address any of the problems discussed above or only address one of the problems discussed above. Further, one or more of the problems discussed above may not be fully addressed by any of the features described below. In the following discussion that addresses a number of embodiments and applications of the present invention, reference is made to the accompanying drawings that form a part hereof, and in which is shown by way of illustration specific embodiments in which the invention may be practiced. It is to be understood that other embodiments may be utilized and changes may be made without departing from the scope of the present invention.

At least portions of the functionalities or processes described herein can be implemented in suitable computer-executable instructions. The computer-executable instructions may be stored as software code components or modules on one or more computer readable media (such as non-volatile memories, volatile memories, DASD arrays, magnetic tapes, floppy diskettes, hard drives, optical storage devices, etc. or any other appropriate computer-readable medium or storage device). In one embodiment, the computer-executable instructions may include lines of complied C++, Java, HTML, or any other programming or scripting code such as R, Python and/or Excel. Further, the present invention teaches the use of processors to perform the functionalities and processes described herein. As such, processor is understood to mean the computer chip or processing element that executes the computer code needed for the performance of a specific action.

Reference is now made in detail to the exemplary embodiments of the invention, examples of which are illustrated in the accompanying drawings. Wherever possible, the same reference numbers will be used throughout the drawings to refer to the same or like parts. It should be understood that throughout this disclosure, unless logically required to be otherwise, where a process or method is shown or described, the steps of the method may be performed in any order or simultaneously. As used throughout this application, the word "may" is used in a permissive sense (i.e., meaning "having the potential to"), rather than the mandatory sense (i.e. meaning "must").

Figure 1A:
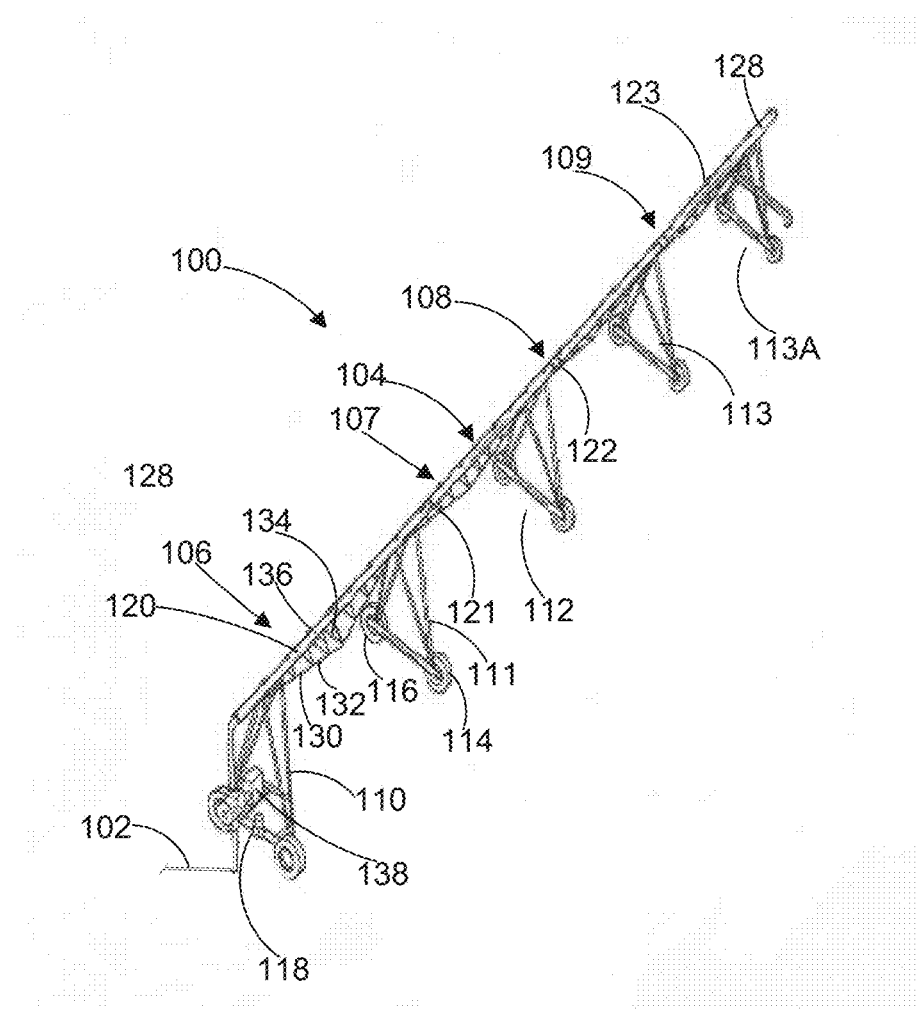
FIG. 1A is a perspective view illustrating an irrigation system in accordance with an example implementation of the present disclosure.

FIG. 1A illustrates a self-propelled irrigation system (assembly) 100 in accordance with example implementations of the present disclosure. FIG. 1A illustrates an implementation of the present disclosure where the irrigation system 100 is a linear move irrigation system. As shown, the system 100 includes a pipeline 102 and a main section assembly 104 (irrigation section assembly) coupled (e.g., connected) to the pipeline 102. Preferably, the pipeline 102 has access to a well, a water repository (e.g., water tank), or other fluid source, to furnish water to the irrigation system 100. For instance, the pipeline 102 may be pressurized to facilitate the transfer of water from the water source to main section assembly 104. The fluid source may be coupled to a repository or other source of agricultural products to inject fertilizers, pesticides, and/or other chemicals into the fluids to create an applicant for application during irrigation. Thus, the applicant may be water, fertilizer, herbicide, pesticide, combinations thereof, or the like.

As shown, the main section assembly 104 may include a number of interconnected spans 106, 107, 108, 109 (e.g., irrigation spans) supported by one or more tower structures 110, 111, 112, 113, 113A. The tower structures 110, 111, 112, 113, 113A may be any tower configuration known in the art to adequately support the conduits (e.g., water pipe sections) described herein. It is understood that the section assembly 104 may include any number of spans and tower structures.

The tower structures 110, 111, 112, 113, 113A preferably may each include wheels 114, 116, to assist in traversing the irrigation system 100 (e.g., allowing the main section assembly 104 to traverse) about a cultivation area (e.g., field). In an implementation, the wheels 114, 116 may be driven by a suitable drive unit 118 (e.g., drive motor), or the like, to assist in traversing the system 100 about the specified area. For example, the tower structure 110 may include a drive unit 118 to propel the irrigation system 100 through the cultivation area. It is understood that while only two wheels 114, 116 are shown coupled to each tower structure 110, 111, 112, 113, 113A, each tower structure 110, 111, 112, 113, 113A may include additional wheels according to the design requirements of the irrigation system 100.

As shown in FIG. 1A, each span 106, 107, 108, 109 may include a respective conduit 120, 121, 122, 123 (e.g., pipes) that are configured to carry (e.g., transport, provide, and so forth) liquid (e.g., applicant) along the length of the system 100 to one or more applicant dispersal assemblies that are configured to irrigate the cultivation area. Each conduit 120, 121, 122, 123 may be coupled to one another to allow fluid communication between each conduit. In an implementation, the conduits 120, 121, 122, 123 may be supported by truss-type framework structures 124, 125, 126. Thus, the main fluid displacement device may be configured to displace applicant through the conduits 120, 121, 122, 123. As shown in FIG. 1A, the irrigation system 100 may also include a cantilevered boom structure 128 that extends outwardly from the end tower structure 112.

As shown in FIG. 1A, multiple truss rods 130 are tensioned between the tower structures 110, 111, 112. In implementations, the truss rods 130 include truss rod segments 132 (i.e., shaft components) extending longitudinally between the truss-type framework structures 124, 125, 126. The truss rod segments 132 may be arranged end-to-end and separated using spreaders 134 suspended from the respective span 106, 107, 108, 109. For example, the spreaders 134 may be suspended from the respective span 106, 107, 108, 109 using, for example, diagonals 136.

Figure 1B:
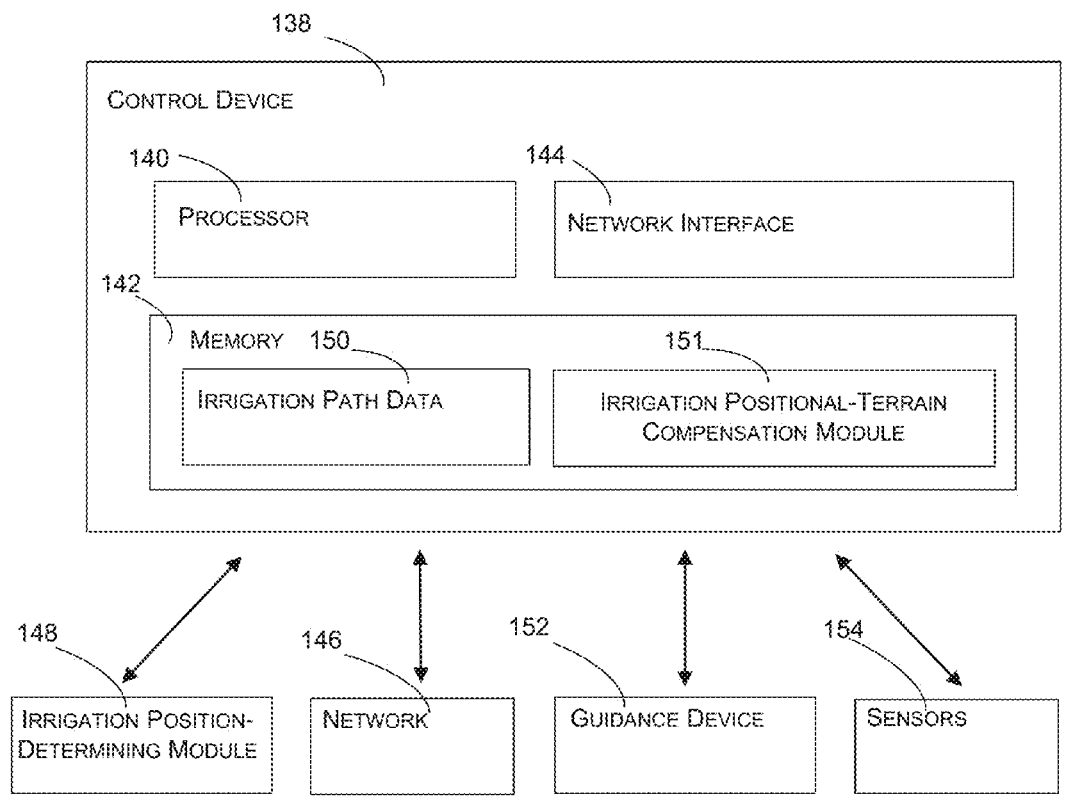
FIG. 1B is a block diagram illustrating a control device of the irrigation system shown in FIG. 1A in accordance with an example implementation of the present disclosure.

As shown in FIG. 1B, the irrigation system 100 of the present invention may preferably include a control device 138, which represents functionality to control one or more operational aspects of the irrigation system 100. As shown, the control device 138 may preferably include a processor 140, a memory 142, a module 151 and a network interface 144.

The processor 140 preferably provides processing functionality for the control device 138 and may include any number of processors, micro-controllers, or other processing systems. The processor 140 may execute one or more software programs that implement techniques described herein. The memory 142 is an example of tangible computer-readable media that provides storage functionality to store various data associated with the operation of the server 102 (client device 104), such as the software program and code segments mentioned above, or other data to instruct the processor 140 and other elements of the control device 138 to perform the steps described herein. The memory 142 may include, for example, removable and non- removable memory elements such as RAM, ROM, Flash (e.g., SD Card, mini-SD card, micro-SD Card), magnetic, optical, USB memory devices, and so forth.

The network interface 144 preferably provides functionality to enable the control device 138 to communicate with one or more networks (depicted in FIG. 1B as network 146). In various implementations, the network interface 144 may include a variety of components such as wireless access points, transceivers, and so forth, and any associated software employed by these components (e.g., drivers, configuration software, and so on).

According to a preferred embodiment, the control device 138 is preferably communicatively coupled with an irrigation position-determining module 148, which is configured to provide location-determining functionality and irrigation path-determining functionality for the irrigation system 100. Location-determining functionality, for purposes of the following discussion, may relate to a variety of different navigation techniques and other techniques that may be supported by "knowing" one or more locations of the irrigation system 100. For instance, location-determining functionality may be employed to provide location data, timing data, speed data, and a variety of other navigation-related data corresponding to the irrigation system 100. As shown in FIG. 1B, the memory 142 may include pre-loaded irrigation path data 150 that provides a desired path for the irrigation system 100 to traverse within a field to irrigate. The pre-loaded irrigation path data 150 may be generated by an operator according to the parameters of the field to be traversed. For instance, the pre-loaded irrigation path data 150 may represent positional data representing the path the irrigation system 100 is to traverse, positional data representing where the irrigation system 100 is to turn, and so forth.

As shown in FIG. 1B, the control device 138 preferably further includes an irrigation positional-terrain compensation module 151, which is functionally coupled to the memory 142 and executable by the processor 140. In an embodiment, the module 151 is networked between the irrigation position-determining module 148 and the processor 140. Preferably, the module 151 represents functionality to adjust a positional value to compensate for a substantially non-flat surface as described in greater detail herein.

In implementations, the irrigation position-determining module 148 may include a receiver that is configured to receive signals from one or more position-transmitting sources. For example, the irrigation position-determining module 148 may be configured for use with a Global Navigation Satellite system (GNSS). In embodiments, the irrigation position-determining module 148 may be a global positioning system (GPS) receiver operable to receive navigational signals from GPS satellites and to calculate a location of the irrigation system 100 as a function of the signals. While a GPS system is described in this document, it is contemplated that a wide variety of other positioning systems may also be used, such as terrestrial based systems (e.g., wireless-telephony systems or data systems that broadcast position data from cellular towers), wireless networks that transmit positioning signals, and so on. Other possible systems include, but are not limited to, a Global Orbiting Navigation Satellite System (GLONASS), a Galileo navigation system, or other satellite navigation system.

As shown in FIG. 1B, the control device 138 is preferably operatively coupled to a guidance device 150 of the irrigation system 100. The guidance device 152 (e.g., steering assembly or steering mechanism) is representative of functionality to control movement of the irrigation system 100. For example, the guidance device 152 may comprise hardware and/or software that is operatively coupled to one or more wheels 114, 116 of the irrigation system 100 that direct movement of the wheels 114, 116 to re-position the irrigation system 100 during operation. In an implementation, the irrigation position-determining module 148 may be configured to cross-reference an actual position of the system 100 with a desired position of the system 100 (e.g. cross-reference with irrigation path data 150). Thus, the control device 138 may be configured to cause the guidance device 152 to control, or direct, movement (i.e. steer) of the wheels 114, 116 in response to determining whether the irrigation system 100 has deviated from the desired path indicated within the irrigation path data 150 or that the irrigation system 100 is to turn in order to continue irrigating the field (e.g. the irrigation system 100 has reached the end of the field, etc.). For example, the control device 138 may cause the device 152 to steer to a desired path once the actual position deviates by at least one percent (1%) from the desired path. However, it is understood that other deviation values are possible. In one or more implementations, the control device 138 may be configured to correct a positioning of the irrigation system 100 based upon cross-referencing the current position (e.g., real-time position) of the system 100 with the irrigation path data. In other words, the control device 138 may be configured to continually monitor the current position of the system 100 with respect to the data 150 to determine whether the irrigation system 100 has deviated from a pre-defined path. In the event that the control device 138 determines that the irrigation system 100 has deviated from a pre-defined path, the device 138 preferably instructs the guidance device 152 to steer the wheels 114, 116 to cause the irrigation system 100 re-align with the predefined path.

According to a further preferred embodiment, module 151 is preferably configured to cause the processor 140 to cross-reference the data 150 (a corresponding desired position) with a current position of the irrigation system determined by the irrigation position-determining module 148. In response, the module 151 may preferably prevent the guidance device 152 from over-correcting the movement of the irrigation system 100. For example, the module 151 may preferably adjust a positional value based upon the terrain such that the guidance device 152 does not steer one or more wheels 114, 116 based upon positional values while traversing the terrain.

According to a further preferred embodiment, the positional value preferably represents an actual position of the irrigation system 100, and the adjustment represents a compensation to the actual position such that when the irrigation system 100 is traversing a hilly or rough terrain, the control device 138 may determine that no substantial deviance from the pre-desired path has occurred. In other words, a positional value representing an actual position of the irrigation system 100 over an at least substantially non-flat terrain is compensated an amount such that when the module 151 cross-references with a corresponding desired position, the module 151 determines that no substantial deviance in the traversed path has occurred.

In another implementation, as shown in FIG. 1B, the control device 138 is preferably communicatively coupled to one or more sensors 154. The sensors 154 may preferably be configured to measure irrigation system 100 movements. Such measurements may include for example measurements of any angle of deviation of the irrigation system 100 with respect to a determined path. Preferably, any such measurement of the angle of deviation is made with respect to two axes such that one of the axes is parallel to the direction of the path upon which the irrigation system 100 is set to traverse and the other axis is perpendicular to the direction upon which the irrigation system 100 is set to traverse.

According to a further preferred embodiment, based upon a set of measurements, the control device 138 is preferably configured to determine whether the irrigation system 100 is traversing an at least substantially non-flat surface. In a specific implementation, the sensors 154 may comprise accelerometers, gravitational pull sensors, combinations thereof, or the like. In response to determining whether the system 100 is traversing an at least substantially non-flat surface, the control device 138 is preferably configured to adjust a positional value (e.g., an actual position value indicating a position of the irrigation system) such that the guidance device 152 does not correct a position of the irrigation system 100 while traversing a hilly or rough terrain. In other words, the control device 138 prevents a substantial positional change of the irrigation system 100 while the irrigation system 100 is traversing the hilly, or rough, terrain.

Figure 2:
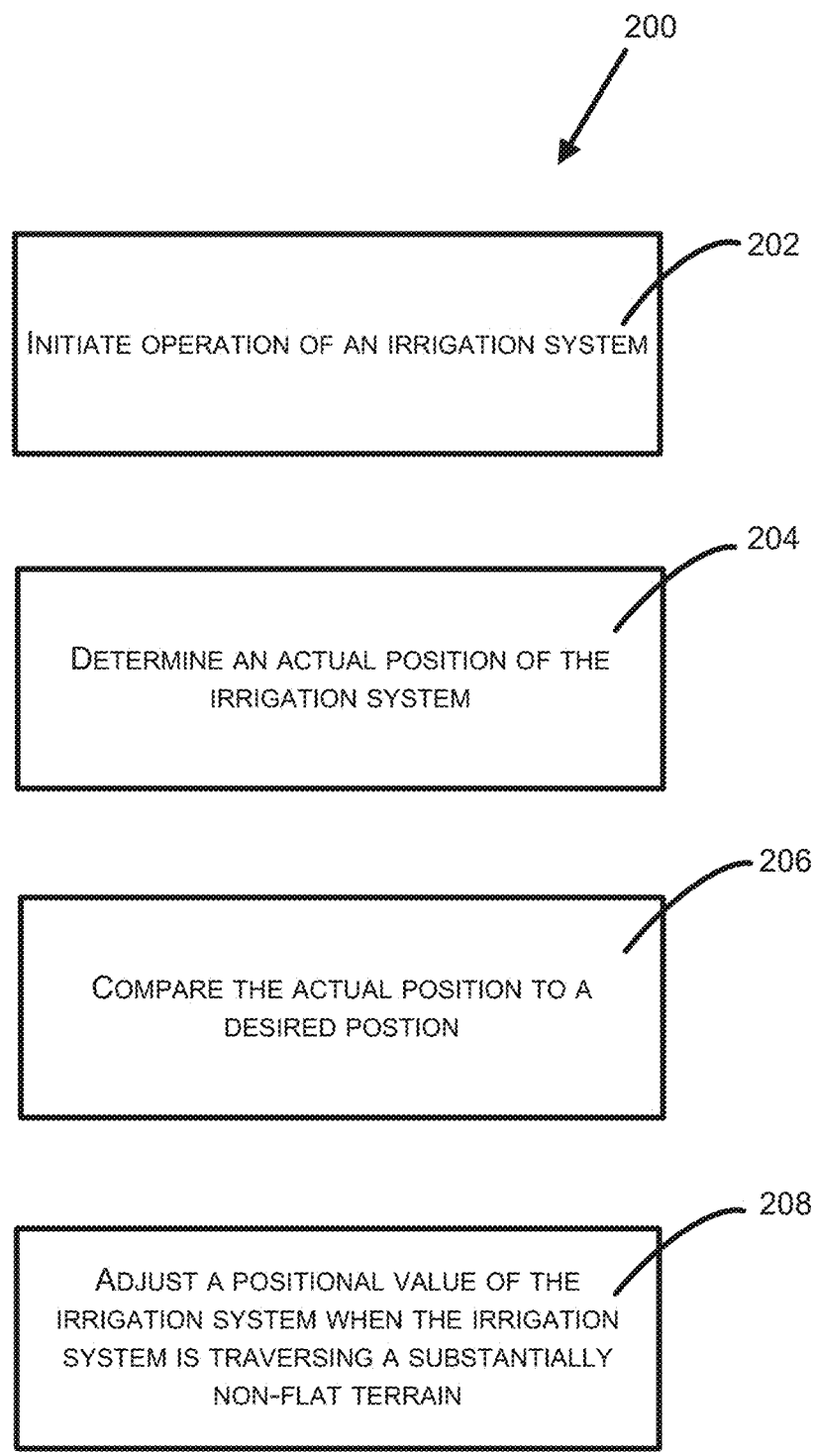
FIG. 2 is a flow diagram illustrating an example method for selecting a segment of a cultivation area to traverse based upon a position of the irrigation system in accordance with the present disclosure.

As shown in FIG. 2, an exemplary method 200 for traversing a cultivation area in accordance with the present disclosure is disclosed. In a first step, an irrigation system is preferably initiated to irrigate a cultivation area (Block 202). In an implementation, the irrigation system 100 is initiated (e.g., powered on, etc.) to cause the irrigation system 100 to irrigate a selected cultivation area. In a second step, an actual position of the irrigation system is determined (Block 204). As described above, an actual position of the irrigation system 100 is preferably determined utilizing an irrigation position-determining module 148 (i.e., a GPS receiver, etc.) that provides positional data representing a position of the system 100 to the control device 138. In a third step, the actual position of the irrigation system is preferably compared with a desired position of the irrigation system (Block 206). For example, the module 151 is preferably configured to compare the current actual position of the irrigation system 100 to a corresponding desired position (e.g., data 150).

As further shown in FIG. 2, a positional value representing an actual position of the irrigation system may preferably be adjusted when a determination is made that the irrigation system is traversing a substantially non-flat terrain (Block 208). In one or more implementations, the module 151 is configured to adjust a positional value indicating an actual position of the irrigation system 100 when the irrigation system 100 is traversing a hilly or rough terrain. Thus, the module 151 is configured to determine that the irrigation system 100 is traversing a substantially non-flat terrain (e.g., via sensors 154). In response to determining whether the system 100 is traversing a substantially non-flat terrain, the module 151 adjusts a positional value (e.g., a terrain positional value) corresponding to an actual position of the system 100. In an implementation, a positional value is adjusted up to at least two percent (2%). In another implementation, the positional value is adjusted up to at least five percent (5%). In yet another implementation, the positional value is adjusted up to at least ten percent (10%). The adjustment represents a compensation to the positional value such that the control device 138 does not cause the guidance device 152 to steer one or more wheels 114, 116 when the irrigation system is traversing a hilly, or rough terrain.

Figure 3:
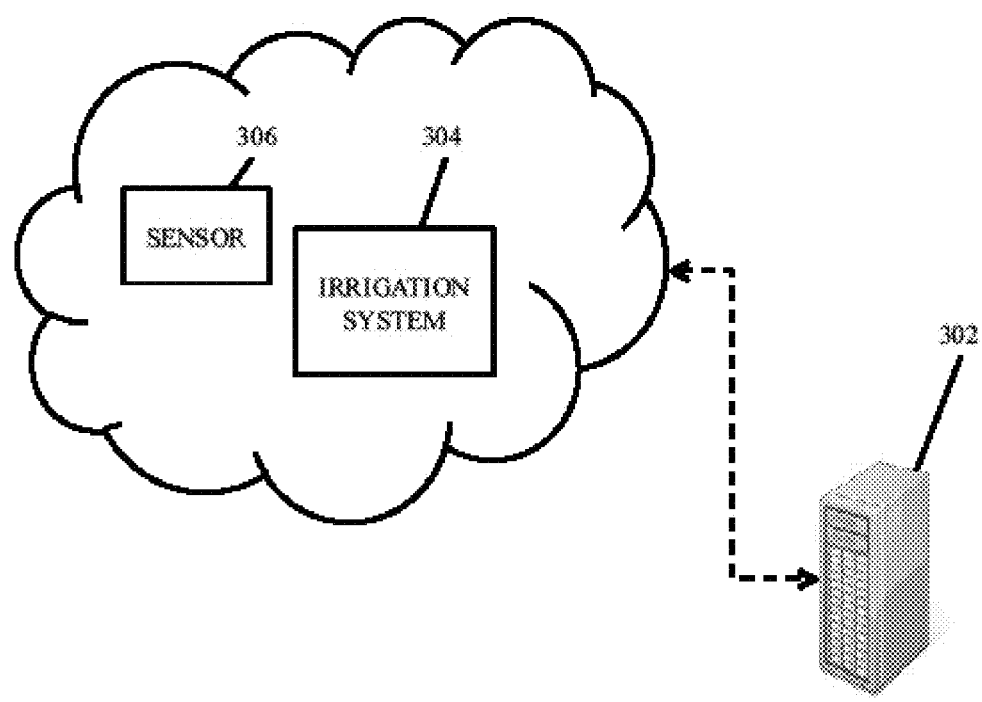
FIG. 3 is a block diagram illustrating an irrigation system in accordance with an example implementation the present invention.

FIG. 3 illustrates a system 300 for corner irrigation, in accordance with the present invention. As shown, a server 302 may interact with the irrigation system 304 to obtain the location data of the irrigation system 304. Thereafter, the irrigation system 304 may preferably interact with a sensor 306 in order to obtain the location data. With the sensor 306 input, the server 302 may preferably determine the last span of the path of irrigation of the irrigation system 304.

The server 302 preferably thereafter compares the obtained location data with the last span of path of irrigation of the irrigation system 304. In case of the location data coinciding with the last span of the path of irrigation of the irrigation system 304, the server 302 may transmit instructions to the irrigation system 304 to pivot about to the next span of the path of irrigation.

Figure 4:
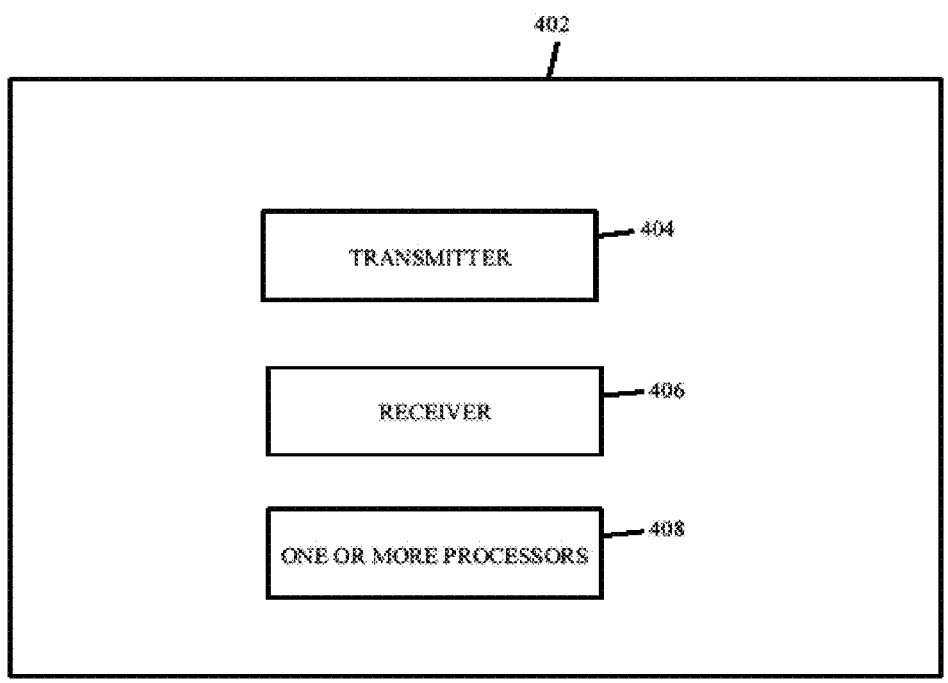
FIG. 4 is a block diagram illustrating an irrigation system in accordance with an example implementation the present invention.

FIG. 4 illustrates a system 400, in accordance with the present invention. The system 400 includes a server 402. The server 402 includes a transmitter 404. The transmitter 404 is coupled to one or more processors 408 to send instructions to the irrigation system for a change of path of irrigation.

The server 402 includes a receiver 406. The receiver 406 obtains the location data of the irrigation system. The one or more processors 408 compare the received location data with the path of irrigation of the irrigation system. In case of the location data coinciding with the last span of the path of irrigation of the irrigation system, the transmitter 404 transmits instructions to the irrigation system to pivot about to the next span of the path of irrigation. Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims.

What is claimed is:

1. A method comprising:
   determining an actual position of an irrigation system by way of an irrigation position-determining module;
   comparing the actual position of the irrigation system with a desired position of the irrigation system;
   determining that the irrigation system is traversing a substantially non-flat surface; and
   adjusting a positional value to prevent substantial positional change of the irrigation system in response to determining that the irrigation system is traversing the substantially non-flat surface.

2. The method as recited in claim 1, wherein the positional value is adjusted at least one percent.

3. The method as recited in claim 1, further comprising causing a guidance device to steer of at least one wheel of the irrigation system when the desired position and the actual position deviate by greater than a predetermined threshold.

4. The method as recited in claim 1, wherein the irrigation position-determining module comprises a Global-Positioning System (GPS) receiver.

5. An irrigation system comprising:
   a main section assembly including a plurality of interconnected spans;
   a plurality of tower structures for supporting the interconnected spans, each one of the plurality of tower structures including a drive unit for driving a tower structure at a selected speed; a position-determining module configured to determine an actual position of the main section assembly;
   a control device communicatively coupled to the position-determining component, the control device configured to:
   determine an actual position of the main section assembly; and
   compare the actual position with a desired position of the main section assembly;
   determine that the main section assembly is traversing a substantially non-flat surface; and adjust a position value to prevent substantial positional change of the irrigation system in response to determining that the main section assembly is traversing the substantially non-flat surface, the positional value representing an actual position of the irrigation main section assembly.

6. The irrigation system as recited in claim 5, wherein the positional value is adjusted at least one percent.

7. The irrigation system as recited in claim 5, further comprising a guidance device configured to steer at least one wheel of the irrigation system when the desired position and the actual position deviate by greater than a predetermined threshold.

* * * * *